E. H. MESSITER.
INTEGRATING MECHANISM.
APPLICATION FILED AUG. 12, 1910.

1,014,604.

Patented Jan. 9, 1912.
4 SHEETS—SHEET 1.

WITNESSES:

INVENTOR

BY his ATTORNEYS

E. H. MESSITER.
INTEGRATING MECHANISM.
APPLICATION FILED AUG. 12, 1910.

1,014,604.

Patented Jan. 9, 1912.

E. H. MESSITER.
INTEGRATING MECHANISM.
APPLICATION FILED AUG. 12, 1910.

1,014,604.

Patented Jan. 9, 1912.
4 SHEETS—SHEET 3.

WITNESSES:

INVENTOR
Edwin H. Messiter
BY
his ATTORNEYS

E. H. MESSITER.
INTEGRATING MECHANISM.
APPLICATION FILED AUG. 12, 1910.

1,014,604.

Patented Jan. 9, 1912.
4 SHEETS—SHEET 4.

UNITED STATES PATENT OFFICE.

EDWIN H. MESSITER, OF BROOKLYN, NEW YORK, ASSIGNOR TO ELECTRIC WEIGHING COMPANY, OF NEW YORK, N. Y., A CORPORATION OF NEW YORK.

INTEGRATING MECHANISM.

1,014,604. Specification of Letters Patent. Patented Jan. 9, 1912.

Application filed August 12, 1910. Serial No. 576,827.

*To all whom it may concern:*

Be it known that I, EDWIN H. MESSITER, a citizen of the United States of America, and a resident of Brooklyn, county of Kings, and State of New York, have invented certain new and useful Improvements in Integrating Mechanism, of which the following is a specification, reference being had to the accompanying drawings, forming a part thereof.

My invention relates to improvements in integrating mechanism, and particularly to means for integrating a quantity which is the function of two other quantities, either or both of which are variable, such quantities representing for instance, force and time components.

A specific application of my invention is the continuous weighing of material as it is being carried by a traveling belt conveyer, the total weight to be computed being determined by the speed of the belt as one of the factors and the weight of the material carried by the belt while passing a given point, as the other factor.

While it is, of course, obvious that my improved integrating mechanism is capable of other applications, I will, for the sake of clearness in the present specification, describe it as applied to the continuous weighing of material carried by traveling conveyers, but it will be understood that the same must not be construed in any manner as a limitation of my invention.

In a co-pending application Serial Number 544,782 filed February 19, 1910, I have described means for continuously weighing material carried by a traveling conveyer comprising an electric circuit fed from a generator whose speed is arranged to be proportionate to the linear speed of movement of the traveling conveyer, and means controlled by the load for inserting resistances varied in proportion to the variations to the weight of the load, in the said circuit, whereby an electric current is proportioned in accordance with the weight of the load and the speed at which it is being carried, the current being then measured and so the total weight of the load carried being thus arrived at.

My invention relates to improvements in apparatus involving this system of integration, the main objects of my invention being, first, to simplify the mechanism as a whole, and second, to provide means for compensating for various errors liable to arise from changes of temperature.

My invention also consists in certain means for adjusting the machine including means for adjusting to the zero point, in means for adjusting the machine for different tensions of conveyer belt where a conveyer belt under tension is employed, and in a number of novel details of construction and combinations of parts such as will be fully pointed out hereinafter, and in order that my invention may be thoroughly understood, I will now proceed to describe an embodiment thereof, having reference to the accompanying drawings illustrating the same, and will then point out the novel features in claims.

The traveling conveyer upon which the material to be weighed is carried is here shown in the form of an endless conveyer belt 15, the upper runway of which is supported by suitable troughing pulleys 16, and the lower runway of which is supported by ordinary cylindrical idler drums or pulleys 17. Two of the troughing pulleys for the upper runway of the belt are carried by a frame 18, and two of the lower idler pulleys 17 are similarly carried by a frame 19. The frames 18 and 19 are connected respectively by means of links 20—21 with weighing levers 22. The connection of the links 20—21 are upon opposite sides of the fulcrums or points of support 23 of the weighing levers whereby the two platforms will counterbalance each other and the empty belt portions will also be counterbalanced. This will leave only the weight of the material carried upon the active portion of the belt as tending to actuate the weighing lever. This method of counterbalancing is not claimed herein but is illustrated for the purpose of disclosing a complete operative machine. It is specifically described and claimed in a co-pending application serially numbered 544,783, filed February 19, 1910.

Figures 1, 2:
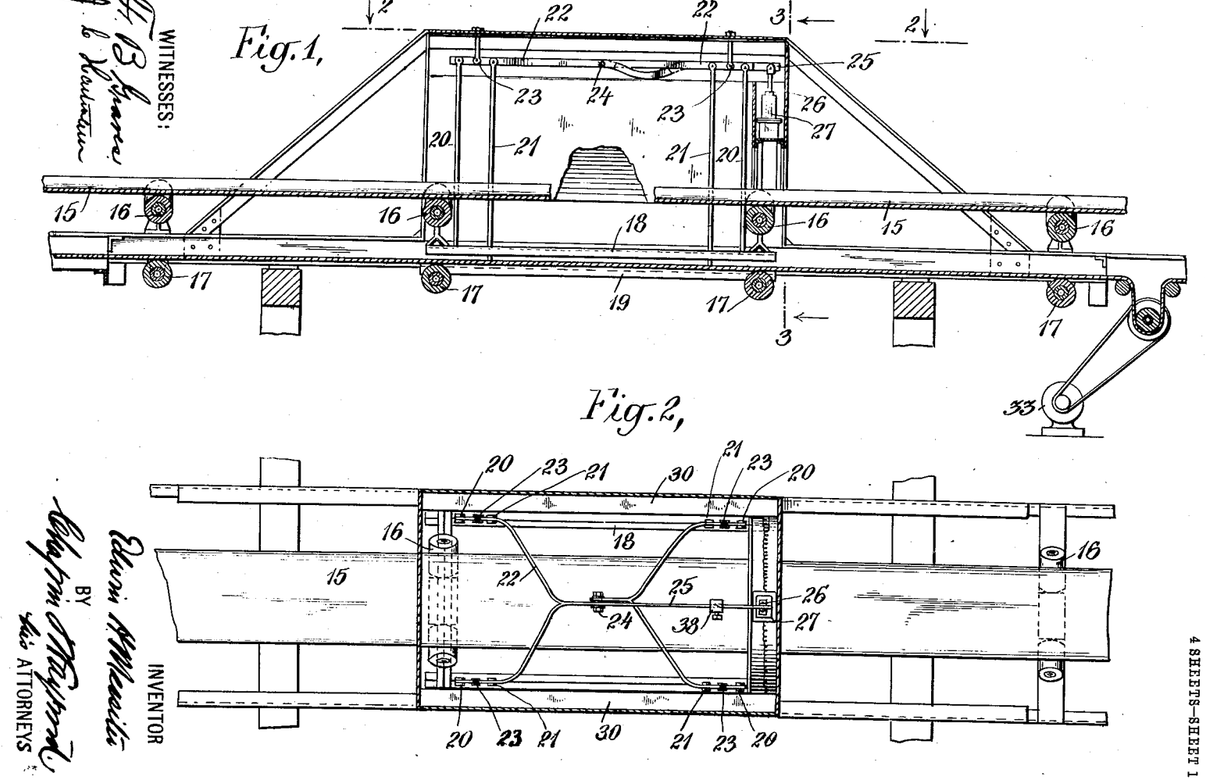
Figure 1 is a view in central vertical longitudinal section through a weighing machine constructed in accordance with my invention.
Fig. 2 is a top view thereof with the upper portion of the casing removed.
Figure 3:
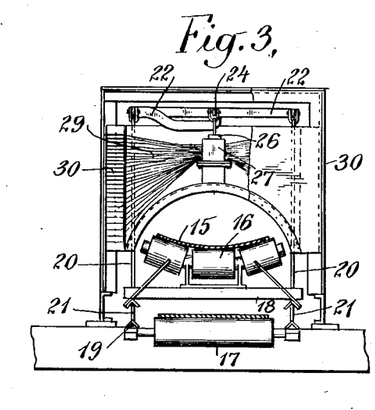
Fig. 3 is a view in transverse section therethrough, the plane of section being upon the line 3—3 of Fig. 1.
Figure 4:
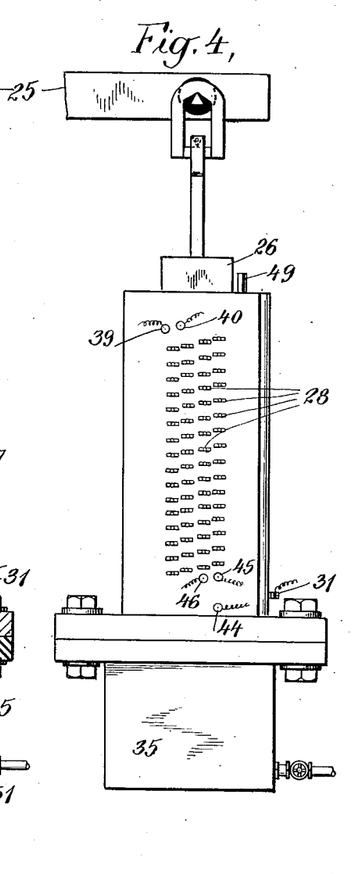
Fig. 4 is a detail view in side elevation of a combined counterbalancing device and circuit closer.
Figure 5:
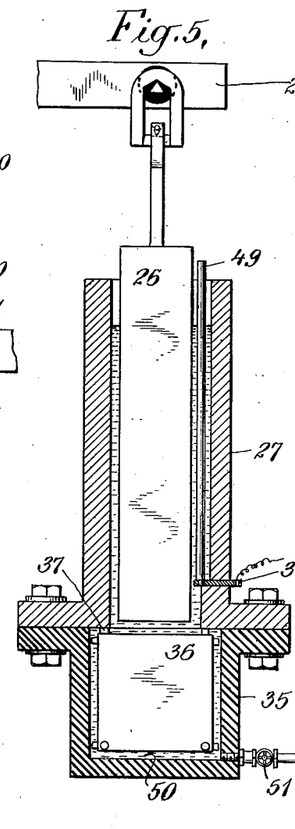
Fig. 5 is a view in central vertical section therethrough.
Figure 6:
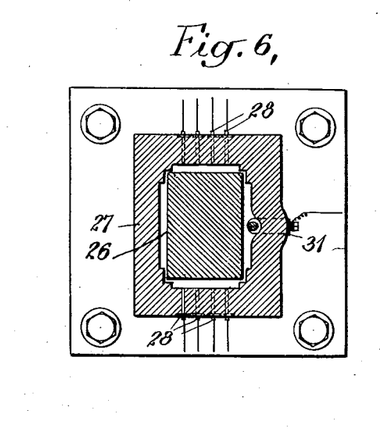
Fig. 6 is a view in horizontal section therethrough.
Figures 7, 8:
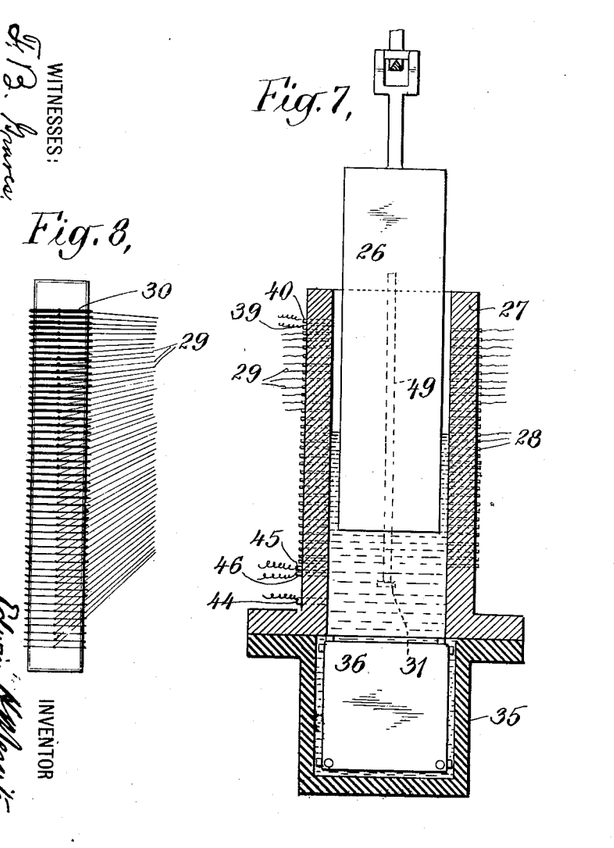
Fig. 7 is a view in central vertical transverse section therethrough upon a plane at right angles to the plane of section of Fig. 5.
Fig. 8 is a detail end view of a resistance device employed.
Figure 10:
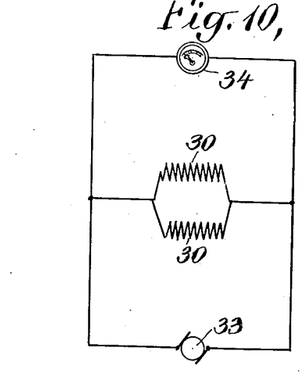
Fig. 10 is a diagrammatic view of the weighing circuit.

The two levers 22—22 are caused to bear the one upon the other at a central point 24, and one of the said levers is provided with an extension 25 to the end of which is pivotally connected a plunger 26. This plunger enters a mercury bath contained in a casing 27. The plunger 26 is loaded so as to be heavy enough to descend in the bath of mercury the distance permitted by the tipping of the said weighing levers or scale beams. The greater immersion, however, the less weight the plunger opposes to the tipping scale beam in one direction, and vice versa, so that as a successively greater load is carried by the platform 18 and the extension 25 of the scale beams is thereby lifted, so a progressively greater weight is opposed to the lifting of the said extension whereby a balance is constantly maintained but at different angles of the scale beam. In other words, the plunger 26 will be caused to raise or lower to an extent directly proportionate to the weight carried by the platform 18 in excess of that carried by the platform 19. Because of the fact that the co-efficient of expansion of mercury is somewhat high the changes in temperature from day to day, and particularly between summer and winter, will vary the specific gravity of the mercury and hence a proportionately greater or less immersion of the plunger will be necessary to compensate therefor or otherwise the scale will not be accurate except at and around some predetermined temperature. In order that this difference in immersion may not materially affect the result aimed at, I employ a material for the vessel having a co-efficient of expansion near that of mercury. Such material is conveniently vulcanized rubber. By this means the volume of the vessel will be varied under changes of temperature proportionately to the variations in specific gravity of the mercury whereby the range of motion of the mercury surface corresponding to a given weight applied to the scale beams will be the same regardless of the existing temperature and hence of the specific gravity, at the time, of the material displaced. As will appear hereinafter it is the range of the vertical motion of the mercury surfaces along the inner walls of the vessel, that is important. In adjusting for the range of motion of the mercury surface it is not necessary to take into account the variations in the area of the plunger with changes in temperature because they are accompanied by changes in the area between the plunger and the vessel which latter changes offset the former with respect to their effect on the resulting position of the mercury surface. In connection with another compensation hereinafter described, the expansion of the plunger is, however, taken into account. I employ the movement of the plunger 26 to vary the position of the mercury surface and thereby to vary the amount of current permitted to pass through an electrical measuring instrument in the following manner: Inserted in the walls of the casing 27 are a number of contact terminals 28 disposed at varying heights throughout the casing, each of the said terminals being connected through suitable wires 29 with the various turns of a resistance coil 30. The walls of the casing 27 are composed of electrically non-conductive material. The mercury is, of course, electrically conductive and as the mercury in the casing 27 rises and falls in proportion to the immersion of the plunger 26 therein, it will follow that the various terminals 28 will be successively connected electrically with the mercury as the mercury rises. There is a common line connection 31 near the base of the casing at which the current will enter and the amount of resistance through which the current must pass will, of course, be determined by the number of turns thereof which are short circuited by the mercury as it reaches and passes the successive terminals. As a matter of convenience I have shown the machine as provided with two resistance devices 30—30 (see Figs. 3 and 10) arranged in parallel with each other, and the said resistances are arranged in a circuit fed by a generator 33 shown diagrammatically in Fig. 10, an electrical registering instrument such as a registering ammeter 34 being shown in parallel with the said resistances. The speed of the generator 33 is, as I have before stated, arranged to be proportionate to the speed of movement of the conveyer belt, a convenient method of maintaining the proportion being to connect the said generator in driving relation with a pulley in engagement with the conveyer belt, as is shown in the said co-pending application Serial Number 544,782. In an arrangement of circuits such as is shown diagrammatically in Fig. 10, it will, of course, follow that the amount of current permitted to pass through the instrument 34 will be proportionate, first, to the speed of the generator 33, and second, to the amount of resistance 30 interposed in the path parallel with the measuring instrument 34, it being understood that the resistance in the various paths is properly balanced in accordance with well known electrical laws to attain this result. As the speed of the generator 33 is proportionate to the speed of movement of the belt, and the amount of resistance 30 interposed is proportionate to the movement of the plunger 26, which movement is determined by the weight of the material as it passed a given point, it will then follow that the indication or registration of the instrument 34 at any moment will be exactly proportionate to the weight carried and the speed at which it is carried past a given point at such moment. In correcting for the variations of specific gravity of the mercury in varying temperature by constructing the vessel of material which will expand to a degree sufficient to compensate therefor, I have introduced or accentuated another error, viz., that the increased volume around the plunger would tend to cause the mercury to stand at a lower level in the casing 27. To compensate for this I have provided the casing 27 with a downward extension 35 conveniently composed of a material having a lower co-efficient of expansion, such, for instance, as iron. The casing 27 has, as has been pointed out, a high co-efficient of expansion. Now as the temperature rises the volume of the vessel 27 if made of rubber increases somewhat faster and the area of the plunger may increase much less rapidly than the volume of the mercury so that, although the compensation hereinbefore described will cause the mercury surface to travel the same distance in response to the increase of a given load on the scale beams 22, this travel of the mercury surface would occur along a lower part of the vessel walls. To compensate for this I increase the quantity of mercury in the vessel 27 when the temperature rises, by the expulsion of mercury from the downward extension 35. The volume of the extension 35 increases less rapidly than the volume of the mercury in it, and its volume is figured with relation to the volume of the vessel 27 in such a way that the level of the mercury in the casing 27 will be maintained at the same point for any predetermined weight on the scale beams 22. Errors due to variations in temperature will, by the foregoing means, be entirely compensated for, as will be well understood. As the increased area of the mercury bath called for by the extension 35 would require the use of a considerable quantity of mercury, and mercury is quite expensive, I preferably employ a block of hard rubber 36 in the extension 35 such as will take the place of a large quantity of such mercury. This block may conveniently float freely in the mercury, the specific gravity of hard rubber being less than that of mercury causing the block to tend to rise therein, such movement being limited by suitable lugs 37 provided for the purpose. It will be understood that these compensations for changes of temperature in the mercury and vessel are for the purpose of attaining a very high degree of precision. For some purposes they will be unnecessary.

Figure 9:
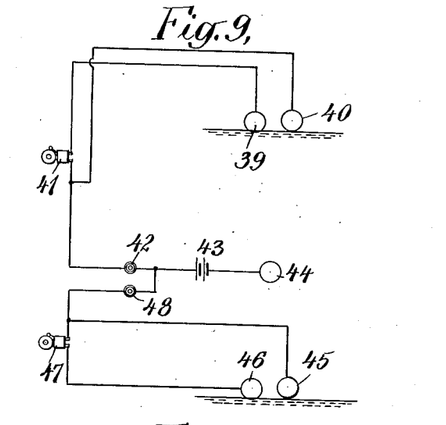
Fig. 9 is a diagrammatic view of certain circuits employed in adjusting the machine.

To facilitate the adjusting of the machine for the zero point, I have provided a compensating weight 38 upon the extension 25 of the scale beam levers, and I have disposed two contact points 39—40 in the wall of the casing 27 near the upper end thereof at approximately the point which will be reached by the upper level of the mercury when there is no load carried by the upper run of the conveyer belt. These two points are connected upon opposite sides of a bell or other signal device 41 as is shown diagrammatically in Fig. 9, one side of the bell being connected through a manual circuit closing device such as a push button 42, and a generator 43 with a common return 44, in connection with the mercury at all times. The contact point 40 is arranged slightly above the contact point 39 so that circuit will first be closed through the contact 39. The contact point 39 is arranged to be closed at exactly the zero point, hence in testing the scale unloaded the push button 42 will be pressed and the bell 41 should respond with a signal. If the mercury does not quite reach the contact point 39 there will be no such signal and it will then be necessary to adjust the weight 38 outward so as to increase the weight at the plunger end of the scale beam levers until the mercury rises to a degree just sufficient to reach the point 39. If the mercury rises above this point it will then close circuit at the point 40, the result of which will be to short circuit the bell and no signal will be given. In such case the weight must be moved backward a little bit until the signal is again given. By arranging the contact point 40 only just above the contact point 39 an exceedingly accurate adjustment may be obtained. It will, of course, be understood that at this point substantially all the resistance is cut out, with the result that the measuring instrument 34 is shunted and no record will be made thereby.

I will now describe the means whereby the machine may be adjusted to compensate for varying belt tensions, it being understood that an increase of belt tension upon the conveyer belt will tend to support the load thereby causing a smaller weight indication for the load than would be proper. I effect this compensation in the following manner: I first adjust the machine to the correct zero point before the belt is in position or before there is any tension upon the belt, then I load the upper platform with a predetermined weight until the plunger is lifted to an extent wherein a contact point 45 provided near the lower end of the casing 27, is uncovered. This contact point 45 is arranged just above another contact point 46, the relation of the contact points 45 and 46 being similar to the points 39 and 40 at the upper end of the casing. These two contact points are connected through suitable wires with the opposite sides of a signal device 47 such as a bell, corresponding to the signal device 41, the said signal device 47 connecting through a push button 48 or the like and through the generator 43 with the common return 44. While both the contact points 45 and 46 are covered by the mercury the signal device 47 will be short circuited, but after the contact point 45 has been uncovered and while the contact point 46 is still covered, a signal may be obtained through the bell 47 by depressing the push button 48. The load placed upon the platform 18 is just sufficient for this purpose so that the machine is now adjusted between two points loaded and unloaded, without belt tension. The belt is now fitted into place and the desired tension applied thereto. A rod 49 is now plunged into the mercury bath, the lower end thereof being conveniently screw-threaded and fitted to the end of the terminal 31, the diameter of this rod being calculated to be of such a size as to reduce the area between the plunger 26 and the walls of the casing 27 to an extent sufficient to compensate for the load carried by the belt tension. The machine is now readjusted to the proper zero point and the same load is then applied to the upper run of the belt upon the platform 18. If the result is a movement of the plunger sufficient to just uncover the point 45 while keeping the point 46 covered, a signal should respond to the pressing of the button 48. If, upon testing, the movement of the plunger is found to have been too great or too little, the rod should be removed and a rod of a proportionately greater or less diameter inserted in lieu thereof. After the insertion of each new rod the machine is again adjusted for the new zero point by the proper manipulation of the compensating weight 38 and another test is made loaded, this operation being continued until the signal responds upon the pressing of the push button 48 under a loaded condition of the belt. By this means an accurate compensation is assured for the belt tension of the particular machine, and thereafter accurate weighing should result.

As a matter of convenience I preferably arrange the height of the vessel 27 so that if the plunger 26 be depressed, as by hand, to a point wherein the lower edge thereof just reaches the upper edge of the block 36, the mercury column should just reach the top of the casing. By this means I am enabled to determine whether or not the proper quantity of mercury is contained in the vessel and to add more thereto if necessary, the excess being caused to run off should there be too much in the vessel. I am also enabled thereby to inspect the surface of the mercury from time to time as may be desired. I have also shown clearance between the bottom of the block 36 and the bottom of the casing extension 35 whereby the plunger and block may be forced downward to a further degree. By this means I expel some of the surface mercury, if desired, the amount expelled being replaced after the block 36 has been allowed to again rise by flotation, upon the release of pressure thereupon, the exact amount being replaced by holding the plunger against the upper surface of the block at this time. The foregoing is quite advantageous for the reason that deterioration of the mercury will take place primarily in the upper portion thereof, and I am thus enabled to replace the upper portion of the mercury without any trouble, at will. I also preferably provide a valve controlled drain 51 at the lower end of the casing extension 35 by which all the mercury may be drawn off at will so that the entire mercury bath may be renewed at any time.

Figures 11, 12:
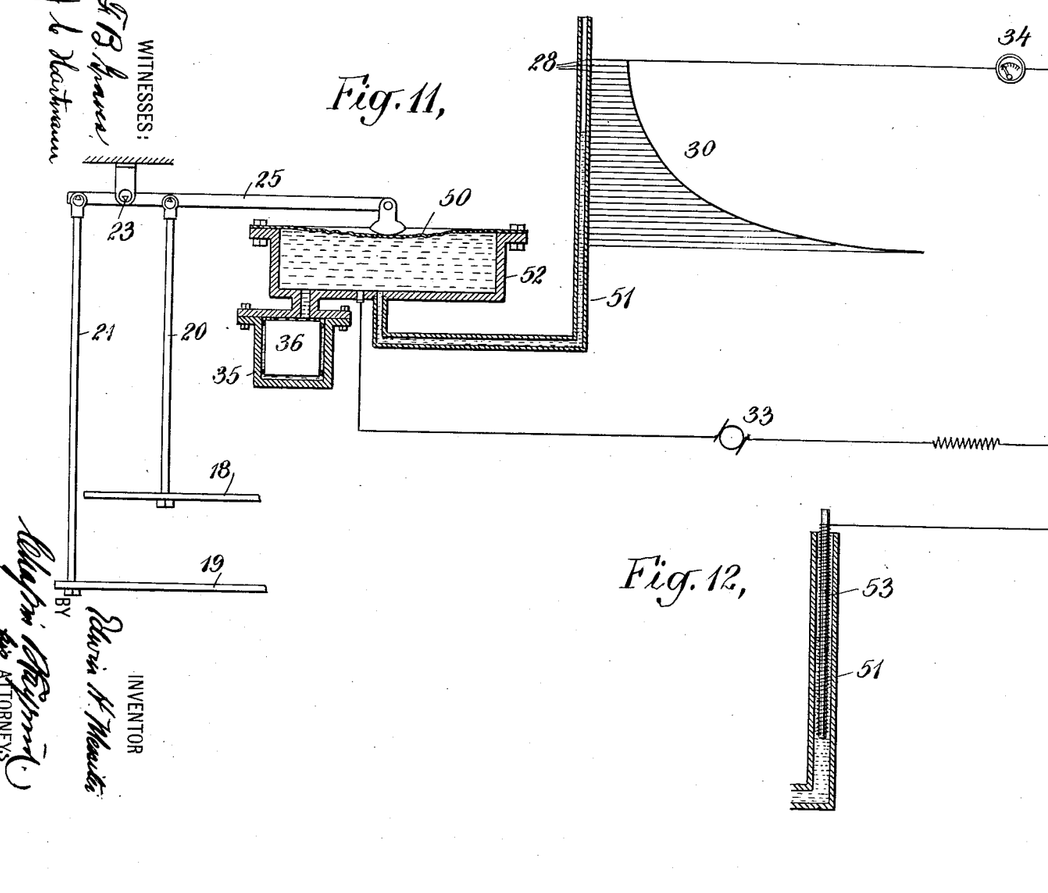
Fig. 11 is a somewhat diagrammatic view of a modified form of the apparatus.
Fig. 12 is a detail view showing a modified rheostat construction in which the rheostat is immersed in mercury.

In Fig. 11 I have shown a modified form of the apparatus which is in all substantial respects an equivalent of that shown in the other figures, but I have shown it as illustrative of one of the many changes in specific construction which may be resorted to within the scope of my invention. In this figure a flexible diaphragm 50 is employed in lieu of the plunger 26, and the mercury, displaced by the movements of this diaphragm, is permitted to rise in a tube 51 connected with a vessel 52 corresponding to the vessel 27. The contact points 28 will in this case be disposed in the walls of the tubes 51. In this case it must be noted, however, that the weight will be resisted by the downward movement of the diaphragm 50 instead of the upward movement of the plunger 27 so that the connecting links 20 and 21 will be reversed with respect to the center of support 23 of the scale beam levers or such other disposition will be made as will cause the load to be applied in the desired direction. The same compensating extension 35 may be employed in connection with the vessel 52 in order to compensate for the changes in volume of the mercury due to temperature changes, and the tube 51 may be made of material having the proper co-efficient of expansion whereby it will produce the compensation for linear movements of the mercury as hereinbefore explained. It may also be noted that because increasing the pressure upon the diaphragm 50 causes the mercury to rise in the tube 51 instead of to fall in the vessel 27 as in the construction first described, the resistance connections will, of course, be reversed and the measuring instrument will be in series with the resistance instead of in parallel therewith, as will be readily understood by reference to Fig. 11.

In Fig. 12 I have shown a modification of the method of introducing the resistance by which a rheostat 53 is inserted in the mercury in the tube 51, the mercury as it rises in the tube short circuiting successive portions thereof. In this case the successive contact points to be closed by the mercury are portions of the resistance device itself.

What I claim is:

1. Integrating means comprising a moving element, the speed of whose movement is one of the factors to be integrated, a liquid immersed plunger, the degree of whose immersion is determined by pressure as another factor to be integrated, such pressure being resisted by the liquid so displaced, an electric circuit, means for proportioning the electro-motive force therein by and in accordance with the speed of movement of the said moving element, means controlled by the amount of liquid displaced for varying the resistance in said circuit in accordance with such displacement, and means for measuring the said electric current.

2. Integrating means comprising a moving element, the speed of whose movement is one of the factors to be integrated, a liquid immersed plunger, the degree of whose immersion is determined by pressure as another of the factors to be integrated, such pressure being resisted by the liquid so displaced, an electric circuit, means controlled by the amount of liquid displaced for varying the resistance in said circuit in accordance with such displacement, an electric generator for generating the current in said circuit, means for varying the speed of the generator in accordance with the speed of movement of the said moving element, and means for measuring the said electric current.

3. Continuous weighing mechanism comprising means for carrying a moving load, a mercury containing vessel, a plunger means connecting the plunger with the said load conveying means, whereby the immersion of the plunger in the mercury will be determined by the weight of the load as it passes a given point, means for generating an electric current, means for proportioning the speed of the generator to the speed of movement of the load conveying means, an electric circuit fed from the said generator, a resistance device for controlling the said electric circuit, and a plurality of electric contacts in the said mercury containing vessel arranged to be successively closed by the mercury as it rises in the said vessel, whereby the amount of current in the said circuit is caused to be proportionate to the weight of the moving load.

4. Integrating mechanism comprising a plunger whose position is determined by the load to be measured, a mercury bath for receiving the plunger, the displacement of the mercury due to the immersion of the plunger therein being arranged to oppose the force exerted by the load to move the plunger, a vessel composed of a material whose co-efficient of expansion is substantially equal to the co-efficient of expansion of the mercury, a plurality of contact points arranged to be successively closed by the mercury as it is displaced, means to compensate for the expansion of the mercury and of the vessel due to rises of temperature, whereby the mercury level for any predetermined load will be unchanged under changes of temperature, means variably controlled by the closing of the contact points by the mercury for proportioning an electric current in accordance with the load, and means for measuring the said electric current to arrive at the load.

5. Continuous weighing mechanism comprising a traveling conveyer, means for supporting a loaded portion thereof, a plunger connected with said supporting means, a mercury bath for receiving the plunger, the displacement of the mercury by the plunger opposing the movement of the said supporting means, a plurality of contacts successively closed by the said mercury as it is displaced, means for compensating for changes in the volume of the mercury, due to changes in temperature whereby the varying movements of the mercury with respect to the contact points will be substantially uniform at different temperatures, means variably controlled by the said closing of the contact points for proportioning an electric current in accordance with the load upon the conveyer, and means for measuring the said electric current.

6. Integrating means comprising a liquid immersed plunger, the degree of whose immersion is determined by pressure as a factor to be integrated, such pressure being resisted by the liquid so displaced, a vessel composed of material having a co-efficient of expansion substantially equal to the co-efficient of expansion of the liquid, a moving element, the speed of whose movement is another of the factors to be integrated, means controlled by the amount of liquid displaced and by the speed of movement of the moving element for proportioning an electric current in accordance thereto, and means for measuring such electric current.

7. Integrating means comprising a plunger whose position is determined by the load to be measured, an electrically conductive liquid in which the plunger is arranged to be immersed and whose displacement due to the immersion of the plunger opposes the force exerted by the load, a vessel for containing the liquid composed of electrically non-conductive material having a co-efficient of expansion which is substantially equal to the co-efficient of expansion of the electrically conductive liquid which it contains, a plurality of contact points therein arranged to be successively reached by the liquid, a moving element, means variably controlled by the number of contact points reached by the liquid and by the speed of movement of the moving element for proportioning an electric current, and means for measuring the said electric current.

8. Integrating mechanism comprising a plunger whose position is determined by the load to be measured, a mercury bath for receiving the plunger, the displacement of the mercury due to the immersion of the plunger therein being arranged to oppose the force of the load exerted by the load to move the plunger, a vessel composed of a material whose co-efficient of expansion is substantially equal to the co-efficient of expansion of the mercury, a plurality of contact points arranged to be successively closed by the mercury as it is displaced, means to compensate for the expansion of the mercury and of the plunger, due to rises of temperature, whereby the linear movement of the mercury upon displacement will be substantially uniform under changes of temperature, a moving element, means variably controlled by the closing of the contact points by the mercury and by the speed of movement of the moving element for proportioning an electric current, and means for measuring the said electric current.

9. Continuous weighing mechanism comprising a traveling conveyer, means for supporting a loaded portion thereof, a plunger connected with the said supporting means, a mercury bath for receiving the plunger, the displacement of the mercury by the plunger opposing the movement of the said supporting means, a plurality of contacts successively closed by the said mercury as it is displaced, means for compensating for changes in the volume of the mercury due to changes in temperature whereby the varying movements of the mercury with respect to the contact points will be substantially uniform at different temperatures, means variably controlled by the said closing of the contact points and by the speed of linear travel of the conveyer for proportioning an electric current, and means for measuring the said electric current.

10. Continuous weighing mechanism comprising a traveling conveyer, means for supporting a loaded portion thereof, a plunger connected with the said supporting means, a mercury bath for receiving the plunger, the displacement of the mercury by the plunger opposing the movement of the said supporting means, a plurality of contacts successively closed by the said mercury as it is displaced, means for compensating for changes in the volume of the mercury due to changes in temperature whereby the varying movements of the mercury with respect to the contact points will be substantially uniform at different temperatures, an electric generator, means for proportioning the speed of movement of the generator in accordance with the speed of linear travel of the conveyer, an electric circuit fed by the said generator, means variably controlled by the said closing of the contact points for proportioning the current in the electric circuit in accordance with that portion of the load upon the conveyer supported by the said supporting means, and means for measuring the current in the said electric circuit.

11. Integrating means comprising a liquid immersed plunger, the degree of whose immersion is determined by pressure as a factor to be integrated, such pressure being resisted by the liquid so displaced, a vessel for containing the liquid in which the plunger is to be variably immersed, means controlled by the amount of liquid so displaced for proportioning an electric current in accordance therewith, means for permanently varying the area between the plunger and the vessel whereby the linear movement of the mercury as it is displaced by the plunger may be varied for predetermined pressures, and means for measuring the electric current.

12. Means for integrating the weight of a variable load comprising a vessel, mercury contained in the said vessel, a plunger arranged for immersion in the mercury, means connecting the plunger with the load to be weighed whereby the displacement of the mercury resists the force exerted by the load, a plurality of electric contact points arranged to be successively closed by the mercury as it rises in the vessel when so displaced, means for permanently varying the area between the plunger and the vessel whereby the linear movement of the mercury as it is displaced by the plunger may be varied for predetermined loads, resistance means controlled by the closing of the said contact points, an electric circuit the current wherein is varied by the said resistance device, and means for measuring the current in the said circuit.

13. Integrating mechanism comprising a plunger whose position is determined by the extent of the load to be measured, an electrically conductive liquid into which the plunger is arranged to be immersed, a vessel for containing the liquid, a plurality of electric contact points arranged to be successively closed by the liquid in the vessel as it rises, due to the immersion of the plunger therein, means for proportioning an electric current in accordance with the contact points thus closed by the liquid, means for measuring such electric current, and an electric indicator arranged for operation by the said liquid at the point reached thereby when the load to be measured is zero.

14. Integrating mechanism comprising a plunger whose position is determined by the extent of the load to be measured, an electrically conductive liquid into which the plunger is arranged to be immersed, a vessel for containing the liquid, a plurality of electric contact points, arranged to be successively closed by the liquid in the vessel as it rises due to the immersion of the plunger therein, means for proportioning an electric current in accordance with the contact points thus closed by the liquid, means for measuring such electric current, an electric indicator arranged in circuit for operation by the said liquid at the point reached thereby when the load to be measured is zero, and adjusting means for the plunger to cause the same to assume the proper position to close the latter said electric circuit when the load is zero.

15. Integrating mechanism comprising a plunger whose position is determined by the extent of the load to be measured, an electrically conductive liquid into which the plunger is arranged to be immersed, a vessel for containing the liquid, a plurality of electric contact points arranged to be successively closed by the liquid in the vessel as it rises due to the immersion of the plunger therein, means for proportioning an electric current in accordance with the contact points thus closed by the liquid, means for measuring such electric current, an electric indicator arranged for operation by the said liquid at the point reached thereby when the load to be measured is zero, and means arranged for operation by the said liquid at a point reached thereby when the load to be measured is a predetermined amount, to indicate the same.

16. Integrating mechanism comprising a plunger whose position is determined by the extent of the load to be measured, an electrically conductive liquid into which the plunger is arranged to be immersed, a vessel for containing the liquid, a plurality of electric contact points arranged to be successively closed by the liquid in the vessel as it rises due to the immersion of the plunger therein, means for proportioning an electric current in accordance with the contact points thus closed by the liquid, means for measuring such electric current, an electric indicator arranged for operation by the said liquid at the point reached thereby when the load to be measured is zero, means arranged for operation by the said liquid at a point reached thereby when the load to be measured is a predetermined amount, to indicate the same, and adjusting means for the plunger to cause the same to assume the proper position to operate the said indicator when the load is zero.

17. Integrating mechanism comprising a plunger whose position is determined by the extent of the load to be measured, an electrically conductive liquid into which the plunger is arranged to be immersed, a vessel for containing the liquid, a plurality of electric contact points arranged to be successively closed by the liquid in the vessel as it rises due to the immersion of the plunger therein, means for proportioning an electric current in accordance with the contact points thus closed by the liquid, means for measuring such electric current, an electric indicator arranged for operation by the said liquid at the point reached thereby when the load to be measured is zero, and means for permanently varying the extent of linear movement of the liquid for predetermined loads.

18. Integrating mechanism comprising a plunger whose position is determined by the extent of the load to be measured, an electrically conductive liquid into which the plunger is arranged to be immersed, a vessel for containing the liquid, a plurality of electric contact points arranged to be successively closed by the liquid in the vessel as it rises due to the immersion of the plunger therein, means for proportioning an electric current in accordance with the contact points thus closed by the liquid, means for measuring such electric current, an electric indicator arranged for operation by the said liquid at the point reached thereby when the load to be measured is zero, adjusting means for the plunger to cause the same to assume the proper position to operate the said indicator when the load is zero, and means for permanently varying the extent of linear movement of the liquid for predetermined loads.

19. Integrating mechanism comprising a plunger whose position is determined by the extent of the load to be measured, an electrically conductive liquid into which the plunger is arranged to be immersed, a vessel for containing the liquid, a plurality of electric contact points arranged to be successively closed by the liquid in the vessel as it rises due to the immersion of the plunger therein, means for proportioning an electric current in accordance with the contact points thus closed by the liquid, means for measuring such electric current, an electric indicator arranged for operation by the said liquid at the point reached thereby when the load to be measured is zero, means arranged for operation by the said liquid at a point reached thereby when the load to be measured is a predetermined amount, to indicate the same, and means for permanently varying the extent of linear movement of the liquid for predetermined loads.

20. Integrating mechanism comprising a plunger, whose position is determined by the extent of the load to be measured, an electrically conductive liquid in which the plunger is arranged to be immersed, a vessel for containing the liquid, a plurality of electric contact points arranged to be successively closed by the liquid in the vessel as it rises due to the immersion of the plunger therein, means for proportioning an electric current in accordance with the contact points thus closed by the liquid, means for measuring such electric current, an electric indicator arranged for operation by the said liquid at a point reached thereby when the load to be measured is zero, means arranged for operation by the said liquid at a point reached thereby when the load to be measured is a predetermined amount, to indicate the same, adjusting means for the plunger to cause the same to assume the proper position to operate the said indicator when the load is zero, and means for permanently varying the extent of linear movement of the liquid for predetermined loads.

EDWIN H. MESSITER.

Witnesses:
D. HOWARD HAYWOOD,
F. B. GRAVES.